US009338648B2

(12) United States Patent  (10) Patent No.: US 9,338,648 B2
Dell'Uomo et al.  (45) Date of Patent:  May 10, 2016

(54) METHOD AND SYSTEM FOR MANAGING AUTHENTICATION OF A MOBILE TERMINAL

(75) Inventors: Luca Dell'Uomo, Turin (IT); Massimo Colonna, Turin (IT)

(73) Assignee: TELECOM ITALIA S.P.A., Milan (IT)

( * ) Notice: Subject to any disclaimer, the term of this patent is extended or adjusted under 35 U.S.C. 154(b) by 1977 days.

(21) Appl. No.: 11/922,505

(22) PCT Filed: Jun. 20, 2005

(86) PCT No.: PCT/EP2005/006582
§ 371 (c)(1),
(2), (4) Date: Mar. 16, 2009

(87) PCT Pub. No.: WO2006/136180
PCT Pub. Date: Dec. 28, 2006

(65) Prior Publication Data
US 2009/0217357 A1   Aug. 27, 2009

(51) Int. Cl.
| H04W 12/06 | (2009.01) |
| H04L 29/06 | (2006.01) |
| H04W 48/04 | (2009.01) |
| H04W 64/00 | (2009.01) |
| H04W 80/00 | (2009.01) |
| H04W 88/08 | (2009.01) |

(52) U.S. Cl.
CPC .............. *H04W 12/06* (2013.01); *H04L 63/10* (2013.01); *H04L 63/107* (2013.01); *H04L 63/205* (2013.01); *H04W 48/04* (2013.01); *H04L 63/08* (2013.01); *H04L 63/20* (2013.01); *H04W 64/00* (2013.01); *H04W 80/00* (2013.01); *H04W 88/08* (2013.01)

(58) Field of Classification Search
CPC .................. H04W 4/02–4/046; H04W 48/04; H04W 12/06; H04W 12/08; H04W 64/00–64/003; H04W 80/00; H04W 88/08–88/10; H04L 63/08–63/0892; H04L 63/10; H04L 63/107; H04L 63/20; G06F 21/31–21/46
USPC .......................... 709/204–207, 223–227, 229; 713/150–151, 155, 168–181; 726/1–5, 726/21, 27–30; 380/270
See application file for complete search history.

(56) References Cited

U.S. PATENT DOCUMENTS

2003/0005117 A1* 1/2003 Kang ..................... H04L 63/10
                                                     709/225
2003/0140246 A1 7/2003 Kammer et al.
(Continued)

FOREIGN PATENT DOCUMENTS

| WO | WO 01/93434 A1 | 12/2001 |
| WO | WO 03/100348 A1 | 12/2003 |
| WO | WO 2004/110026 A1 | 12/2004 |

OTHER PUBLICATIONS

Calhoun et al. "Extensible Authentication Protocol Support in RADIUS", RADIUS Working Group, Internet-Draft, Updates: RFC 2138. <http://tools.ietf.org/id/draft-ietf-radius-eap-05.txt> Published: May 8, 1998.*
B. Aboba et al., "Extensible Authentication Protocol (EAP)," Network Working Group, RFC3748 , pp. 1-56 (2004).
H. Haverinen et al., "Extensible Authentication Protocol Method for GSM Subscriber Identity Modules (EAP-SIM)," Network Working Group, Internet Draft, pp. 1-75 (2004).

*Primary Examiner* — Linglan Edwards
*Assistant Examiner* — Kevin Bechtel
(74) *Attorney, Agent, or Firm* — Finnegan, Henderson, Farabow, Garrett & Dunner, L.L.P.

(57) ABSTRACT

A terminal is authenticated in view of inclusion in a communication network by an authentication process conditioned upon location information transmitted from the terminal to at least one server in the network. At least one access point for the terminal to the network is configured for allowing a non-authenticated terminal to transmit to an authentication server in the network authentication messages based on a given authentication protocol, such as, e.g., EAP. The terminal is configured for transmitting the location information to the authentication server by conveying it over the authentication protocol. A location system can be integrated in the terminal to generate location information identifying the location of the terminal, and in that case the terminal is configured for transmitting the location information identifying the location of the terminal to authentication server. As an alternative, a location server is associated with the network and the location information is transmitted from the terminal to the location server. On the basis of the location information transmitted from the terminal, the location server generates location information identifying the location of the terminal and sends the information to the authentication server.

12 Claims, 10 Drawing Sheets

(56) References Cited

U.S. PATENT DOCUMENTS

| | | |
|---|---|---|
| 2003/0217122 A1 | 11/2003 | Roese et al. |
| 2003/0217137 A1* | 11/2003 | Roese et al. ............... 709/223 |
| 2004/0028017 A1 | 2/2004 | Whitehill et al. |
| 2004/0059914 A1 | 3/2004 | Karaoguz |
| 2004/0121787 A1 | 6/2004 | Day et al. |
| 2004/0166878 A1* | 8/2004 | Erskine ............... H04W 48/04 455/456.1 |
| 2004/0190718 A1 | 9/2004 | Dacosta |

* cited by examiner

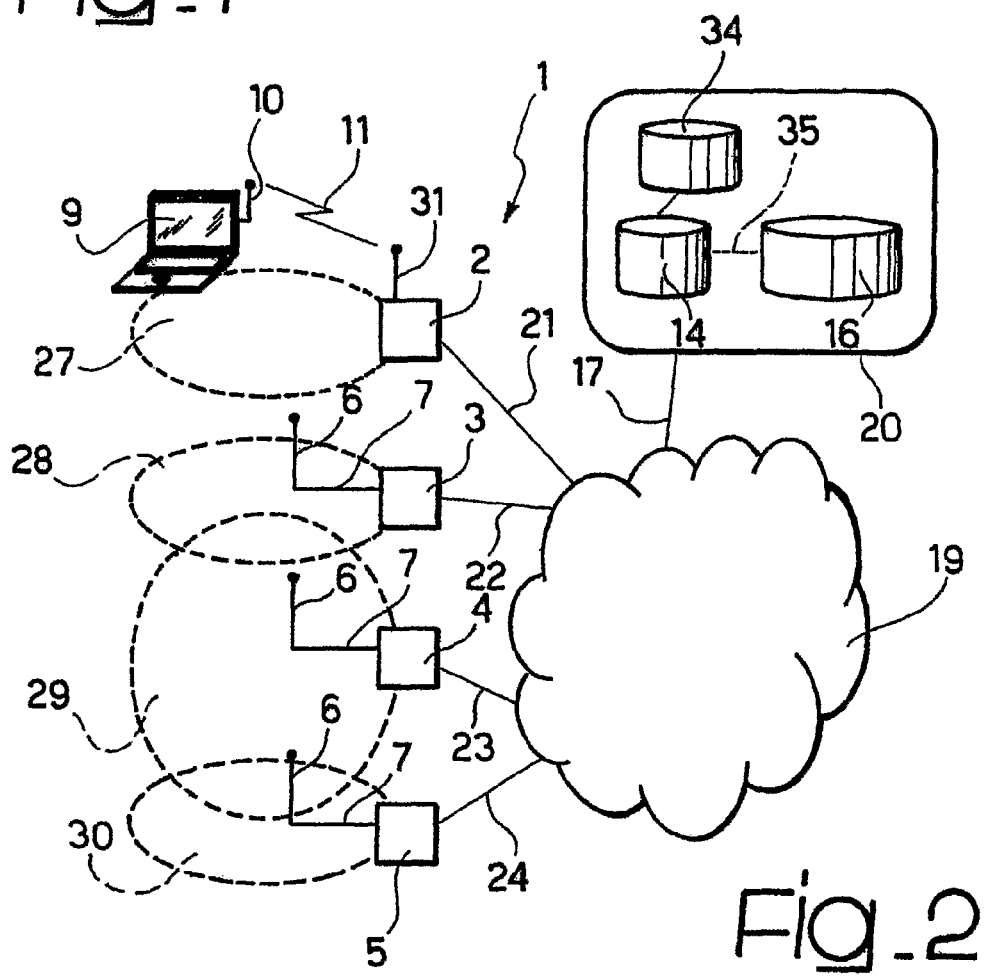
Fig_1
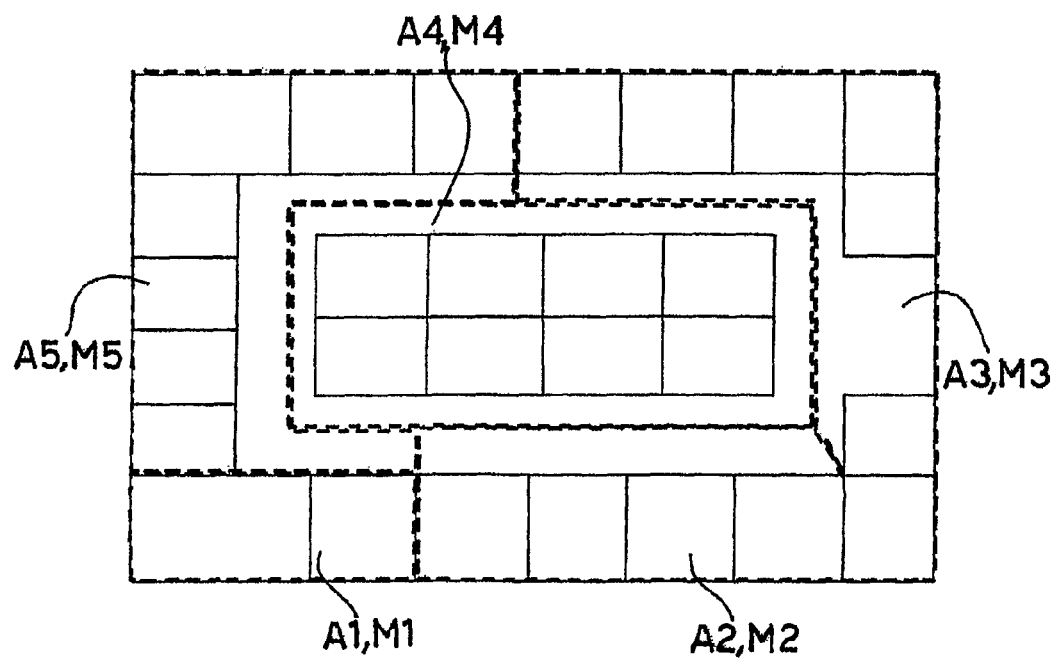
Fig_2

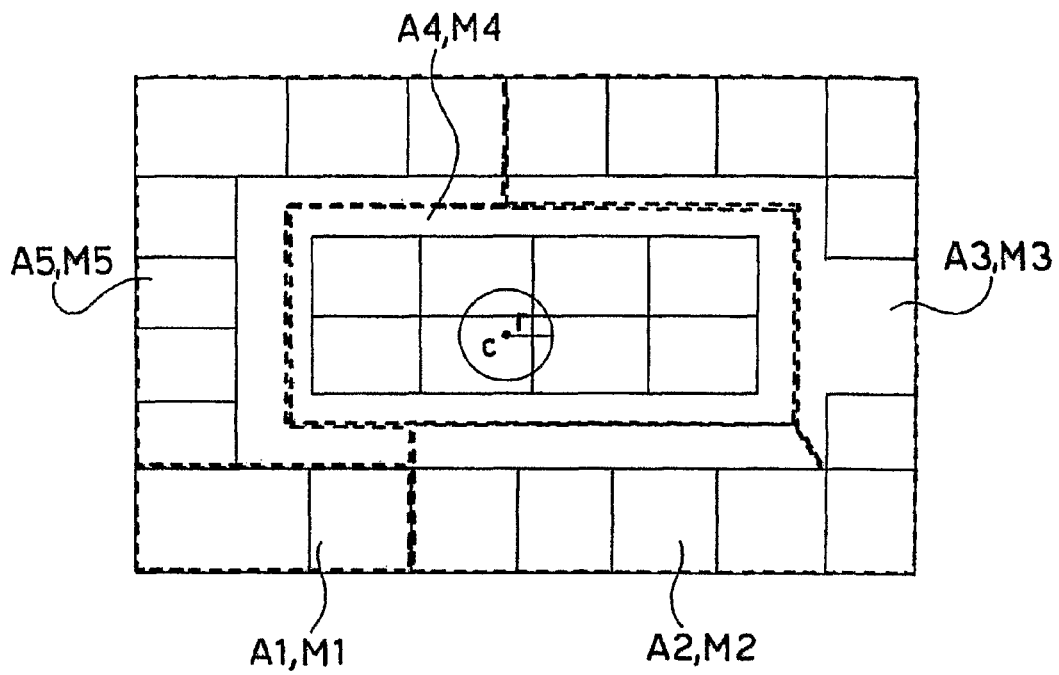
Fig_11
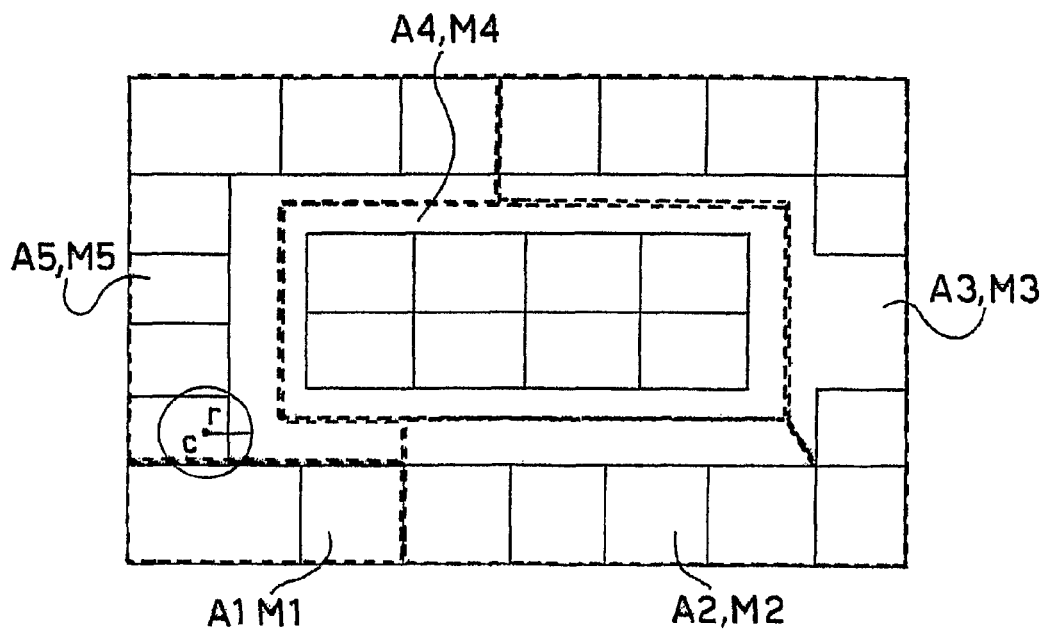
Fig_12

METHOD AND SYSTEM FOR MANAGING AUTHENTICATION OF A MOBILE TERMINAL

CROSS REFERENCE TO RELATED APPLICATION

This application is a national phase application based on PCT/EP2005/006582, filed Jun. 20, 2005, the content of which is incorporated herein by reference.

FIELD OF THE INVENTION

The present invention relates to techniques for management of communication enabling authentication of a mobile terminal in a telecommunications network.

The invention has been developed with particular attention paid to its possible use in wireless local networks, metropolitan networks or geographic networks.

As used herein, "authentication" is meant to designate, in general, those procedures that lead a given terminal to be identified (preferably in a secure manner) and enabled to communicate (again preferably in a secure manner) over a given communication network. As such, that designation extends to those techniques that permit the exchange of "secrets" (e.g. encryption keys) to establish secure communication from and/or to a terminal in a communication network.

DESCRIPTION OF THE RELATED ART

The document WO-A-03/100348 illustrates a method for enhancing security in a wireless network using measurements of distance between mobile terminals to provide an additional layer of security in the communications. In that method, measurement of the distance between two terminals is used to determine enabling of communication between the two terminals belonging to the network. The distance measurements are made by triangulation of the distances between a number of terminals or using the known TDOA (Time Difference Of Arrival) technique.

The document WO-A-01/93434 illustrates a method in which, for calculation of the distances between a mobile terminal and a remote terminal belonging to the network, use of a UWB (Ultra Wide Band) transmitter and receiver is required. Communication between a local device and the remote device can be enabled or disabled according to the distance between the remote device and the local device. Along the same lines, in the method presented in the document US-A-2004/121 787, the position in which the mobile terminal is set in a WLAN (Wireless Local-Area Network) is determined using the known TDOA (Time Difference Of Arrival) technique on the signals transmitted by the terminal itself.

Also the document US-A-2003/217 122 illustrates a method for managing security of a wireless/wired network on the basis of the position of the terminals. The position of the terminals, in the case of a wireless network, can be supplied by the terminal itself, for example via a GPS device integrated therein, or else can be derived by the network starting from power or delay measurements made by the Access Points on the signals transmitted by the terminals (for example, using triangulation techniques). The location information is used for enabling or denying access either totally or partially to the network and to the information that it makes available.

Other methods and systems that set themselves the same target are described in the documents US-A-2004/028 017, US-A-2004/059 914 and US-A-2004/190 718.

All the above systems use the calculation of the distance or position as authentication method proper, in addition to the methods commonly used (for example, the ones based upon username and password), in so far as the position or distance is used for enabling the communications or not.

In a further method, illustrated in the document US-A-2003/140 246, the position of the terminal is used to decide what is to be the security level to use in communications between the terminal and the network. In particular, in said document, two different embodiments are envisaged, namely, a first embodiment, in which the security level is managed by a computing system set in the network, which receives the position of the terminal from a purposely provided location-sensing system, and a second embodiment, in which the level of security is managed entirely by the mobile terminal itself. From a specific analysis of just the first embodiment, comprised therein is the scenario in which the location-sensing system is integrated in the user terminal.

The scenario analyzed envisages that the location-sensing system is for example a GPS receiver or, alternatively, that the terminal has algorithms for calculating its own position (for example, on the basis of measurements made by it). In both cases, the terminal transmits its own position to the computing system via a communication system.

In this case the creation of a second communication system parallel to the one employed for use of the services becomes necessary, or else, alternatively, the use of the same communication system, and hence of the same communication protocols employed for use of the services, becomes necessary (e.g., by encapsulating the location information in TCP/IP packets).

Both of the arrangements present a considerable disadvantage: the first option (parallel communication system) involves a considerable increase in costs in so far as it requires the provision of a second network for conveying just the location information, whilst the second option (encapsulation of the location information in TCP/IP packets) jeopardizes the security of the network in so far as the intermediate apparatuses, for example Access Points, switches, and routers are not able to verify the effective content of the packets that they receive and accordingly forward (the important thing for these apparatuses is that the packets should be of an Ethernet type, an IP type, or the like).

In this second case, a user not authorized for access to a given area could even so carry out attacks on the network by resorting, for example, to continuous sending of ICMP/IP control packets (e.g., the so-called "pinging") that make use of the same communication protocol (the IP protocol) used for the user data and location data.

The same problems are present also in another possible scenario in which location is performed by a location-sensing system via the measurements made by the terminal, which are then to be transferred by the terminal itself to the location-sensing system.

OBJECT AND SUMMARY OF THE INVENTION

From the foregoing description of the current situation, it emerges that there exists the need to define solutions capable of treating authentication of a mobile terminal in a telecommunications network in a more satisfactory way as compared to the solutions according to the known art described previously. More specifically, even though the techniques that enable conditioning, either totally or partially, of the authentication of a terminal at its position may be considered more or less consolidated, the problem of enabling a terminal that is not yet authenticated to send to the network, in a simple and efficient way, the location information that is to be used for authentication remains open.

A particular object of the present invention is to provide a method and a system that enable management of authentication of a wireless terminal on the basis of the position assumed by the latter without requiring a parallel communication system to be created and without jeopardizing network security.

The object of the invention is thus to provide a fully satisfactory response to the above needs.

According to the present invention, that object is achieved by means of a method having the features set forth in the claims that follow. The invention also relates to a corresponding system, a related network, as well as a computer-program product, which can be loaded into the memory of at least one computer and which includes portions of software code for executing the steps of the method of the invention when the product is run on a computer. As used herein, the term "computer-program product" is used to refer to a computer-readable medium containing instructions for controlling a computer system for coordinating execution of the method of the invention. Reference to "at least one computer" is evidently intended to highlight the possibility for the present invention to be implemented in a distributed/modular fashion.

The claims form an integral part of the disclosure of the invention provided herein.

A preferred embodiment of the invention is thus a method of authenticating a terminal for inclusion of said terminal in a communication network (i.e. for permitting that terminal to communicate over said communication network), wherein authentication is conditioned upon location information transmitted from said terminal to at least one server in the network, by:
  providing in the network at least one Access Point for the terminal, said Access Point being configured for allowing a non-authenticated terminal to transmit to an Authentication Server in the network authentication messages based on a given authentication protocol (e.g. EAP); and
  transmitting said location information from said terminal to said Authentication Server by conveying said location information over said given authentication protocol.

In the presently preferred embodiments, the arrangement described herein is based on two different scenarios for conveying the location information of the mobile terminal.

In a first scenario, the location information is transmitted by a location-sensing system integrated in the terminal to an authentication system.

Alternatively, in a second possible scenario, the measurements made by the terminal are transferred to a location-sensing system, external to the terminal, which, by processing these measurements, is able to calculate the position of the terminal.

In the aforesaid preferred embodiment, transfer of the location information of the terminal is preferably made by means of a signaling protocol, and in a particularly preferred way by means of the EAP (Extensible Authentication Protocol). The EAP protocol is developed by IETF (Internet Engineering Task Force) and is described in the following document: RFC3748, B. Aboba, L. Blunk, J. Vollbrecht, J. Carlson, H. Levkowetz; "Extensible Authentication Protocol (EAP)".

That protocol is normally used in networks for transfer of all the authentication messages between a terminal and an Authentication Server.

In order to enable use of this protocol in the arrangement described herein, its functions are extended in such a way that it is able to convey the aforesaid location information or the measurements for calculation of the location. In this way, the arrangement described herein presents the advantage of not requiring the creation of a second ad hoc communication network and offers the maximum guarantee of security thanks to the properties of the EAP.

The security is ensured by the fact that the Access Points (APs) block the traffic coming from a given terminal until said terminal has positively concluded the authentication procedure. The EAP prevents entry into a network of a user that is not authenticated, and hence not authorized to access a given area of the network.

Even if the authentication procedure has yielded a negative result, the Authentication Server continues to receive, through the EAP, the locations or measurements from the terminal. This function may be useful for a possible subsequent authentication in the case where the user were to enter an area of the network for which it is enabled.

The properties of the EAP enable this function since the APs allow passage to the network of all the EAP messages, even the ones of a non-authenticated terminal.

Furthermore, it is possible to use all the authentication protocols based upon the EAP, called EAP methods e.g., EAP-SIM Extensible Authentication Protocol-Security Information Management, as described in the document draft-haverinen-pppext-eap-sim-16.txt, H. Haverinen, J. Salowey, "Extensible Authentication Protocol Method for GSM Subscriber Identity Modules (EAP-SIM)", PEAP Protected Extensible Authentication Protocol (Avaya, Inc.), LEAP Lightweight Extensible Authentication Protocol (Cisco Systems, Inc.), commonly used in the wireless networks, without introducing any modification therein.

Since the new messages for conveying the location information, added to the EAP, have the same field format and adopt, for filling those fields, the same codes used in the standard EAP messages, they can be used by any radio technology that uses the EAP for security management and can be thus conveyed by the corresponding protocols without any modification to said messages.

Extension of the functions of the EAP exclusively requires an upgrading of the software residing in the Access Points in such a way that they are able to recognize the new messages. No modifications are required, instead, on the other apparatuses of the network (routers, switches), in so far as these are transparent to the EAP.

Upgrading is in any case far from costly in so far as it can be performed remotely and simultaneously for all the Access Points involved.

With reference to a presently preferred embodiment of the arrangement described herein, in a first scenario in which the terminal is able to determine autonomously its own position, i.e., the terminal is provided with an on-board location-sensing system, the arrangement envisages an exchange of information between an Authentication Server and a terminal according to the following procedure:
  the Authentication Server receives an authentication request from the terminal;
  the Authentication Server asks the terminal for its position via a purposely defined EAP message;
  the terminal sends its own position, via another purposely defined EAP message, to the Authentication Server; said message possibly comprises the estimate of the absolute error;

on the basis of the information received, the Authentication Server decides which authentication method is the most appropriate for use with the terminal in question; and at the end of the authentication procedure, whether it has been successful or not, the terminal, once again upon request of the Authentication Server, periodically sends its own position to the Authentication Server, via two new purposely defined EAP messages, for the subsequent authentications.

Once again with reference to one of the presently preferred embodiments of the arrangement described herein, in a second scenario in which the terminal only performs measurements on the signal received without being able to determine its own position, the arrangement envisages an exchange of information between a Location Server and an Authentication Server which cooperate with one another and with the terminal according to the following procedure:

the Authentication Server receives an authentication request from the terminal;

the Authentication Server indicates, via a purposely defined EAP message, that the terminal must transmit the measurements made on the signal received from the various Access Points;

the terminal sends said measurements to the Authentication Server via a purposely defined EAP message;

the Authentication Server sends the measurements to the Location Server;

the Location Server, on the basis of the measurements received, estimates the position of the terminal;

the Location Server sends to the Authentication Server the estimated position of the terminal and possibly, if available, the absolute error committed in the estimate;

on the basis of the information received, the Authentication Server decides which authentication method is the most appropriate for use with the terminal in question;

at the end of the authentication procedure, whether it has been successful or not, the terminal, once again upon request from the Authentication Server, periodically sends its own position to the Authentication Server, via two new purposely defined EAP messages, for the subsequent authentications.

The position or measurement request made to the terminal and the responses of the latter are carried out via new EAP messages. In this way, it is possible to authenticate a terminal correctly at the moment of its entry into the network and it is also possible to follow it even though the authentication procedure has not been successful. Using the property of the EAP that enables blocking of the traffic of all the non-authenticated users allowing only passage of the EAP messages, said arrangement guarantees security of the network.

It is evident that the arrangement described above can be used without any substantial modifications also for managing the ciphering and/or integrity-protection method and the corresponding lengths/times of validity of the keys to be used in the secure communications between the terminal and the network downstream of the correct authentication. The arrangement can likewise be used only for managing updating of the ciphering and/or integrity-protection keys (and/or methods) and/or the length of the keys on a position basis.

BRIEF DESCRIPTION OF THE ANNEXED DRAWINGS

The invention will now be described, purely by way of non-limiting example, with reference to the figures of the annexed plate of drawings, in which:

FIG. 1 illustrates a first example of a scenario of application of the arrangement described herein;

FIG. 2 illustrates an example of a map representing an environment covered by different Authentication Areas in the framework of the arrangement described herein;

FIG. 11 illustrates a second example of map representing an environment covered by different Authentication Areas in the context of the arrangement described herein; and FIG. 12 illustrates a further example of a map representing an environment covered by different Authentication Areas.

DETAILED DESCRIPTION OF EXEMPLARY EMBODIMENTS OF THE INVENTION

Figure 3:
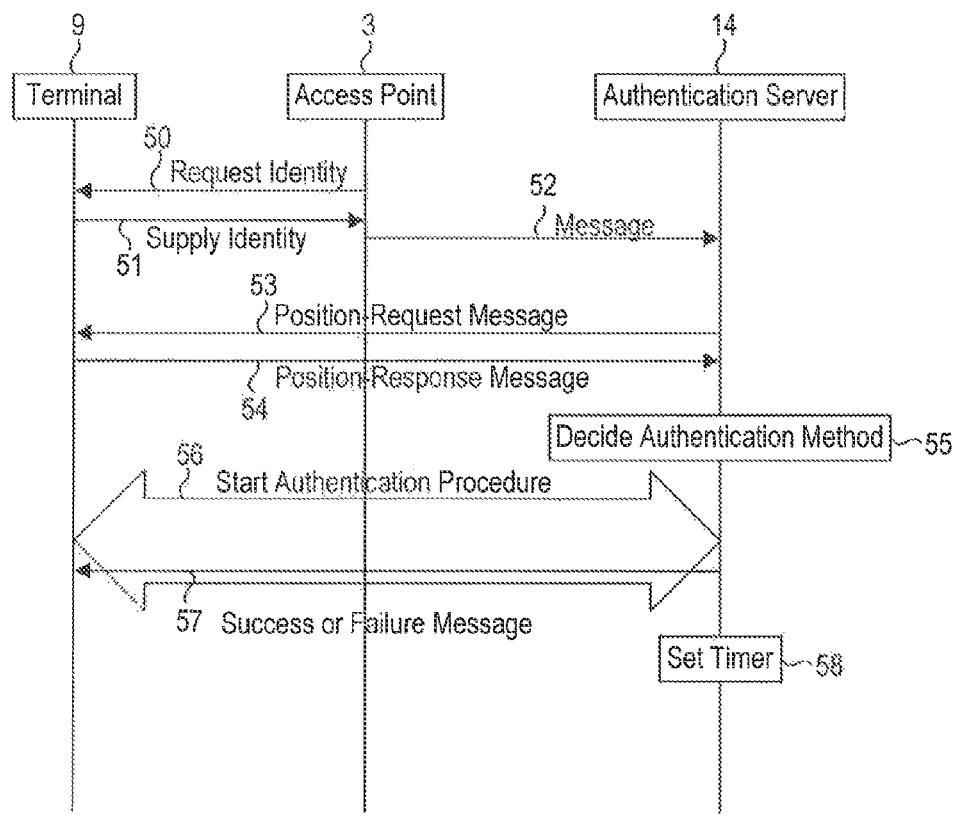
FIG. 3 illustrates the procedure corresponding to the first authentication of a user in the network of FIG. 1.

A preferred embodiment of the invention is described with reference to a WLAN (Wireless Local Area Network); however, the arrangement is applicable also to metropolitan networks and cellular networks irrespective of the specific characteristics of the radio technology employed.

FIG. 1 represents a WLAN, designated as a whole by the reference number 1, constituted by a set of Access Points 2, 3, 4 and 5, equipped either with an integrated antenna 31 or with a non-integrated antenna 6. In the case of non-integrated antennas 6, these are connected to the Access Points 3, 4, 5 via a cable 7 of appropriate length. The users that wish to use services made available by the network 1 use devices constituted by purposely provided wireless user terminals 9, such as for example desktop or laptop PCs (personal computers), or PDA (Personal Digital Assistant) palmtops, equipped with a WLAN apparatus 10, such as for example a PCMCIA (Personal Computer Memory Card International Association) card, a PCI (Peripheral Component Interconnect) adapter, etc., integrated or otherwise in the terminal itself, and the communications are obtained through a radio means 11 with a proprietary or standardized protocol, such as for example the IEEE 802.11 protocol or the HYPERLAN Type 2 protocol.

The Access Points 2, 3, 4, 5 provide a radio coverage of the area of interest constituted by non-overlapping cells, designated by the reference numbers 27 and 28 or overlapping cells, designated by the reference numbers 28, 29 and 30, and are connected to a wired network 19 through the links 21, 22, 23 and 24.

Using the wired network 19, the users 9 gain access to all the services at their disposal. Present on the network is an Authentication Server 14 for management of authentication of the users 9 that wish to gain access to the network and a Database 16 that manages the profile of the users 9 (this database can be in common to that of other networks, such as that of GPRS (General packet radio services) and/or UMTS (Universal Mobile Telecommunications System) and can be remotized in the home network of the user, in which case access to this database would be governed by roaming agreements). These objects are located in a Server Farm 20 connected to the network 19 through a link 17.

The terminal 9 is able to determine its own position either because it has available an ad hoc apparatus integrated therein, such as, for example, a GPS (Global Positioning System) receiver, or because it is configured so as to implement one or more algorithms that determine the position on the basis of the characteristics of the signal received by the different Access Points 2, 3, 4, 5. In the latter case, the terminal 9 also has available a database of its own, in which the information necessary for location is stored, such as, for example, the position of the Access Points, their radio-electrical parameters, etc.

The Authentication Server 14 has available a database 34 of its own, which can be integrated or otherwise with the Authentication Server 14 itself and which contains:

a map representing the area within which the WLAN is provided and in which it is necessary to manage authentication of the terminals on the basis of their positions;

a list of all the active terminals with the indication for each of them of:
  the identifier (for example, the Medium Access Control—MAC—address);
  the last position estimated;
  the accuracy of the estimate;
  the time at which the estimate was made;
  the state of authentication of the terminal, i.e., authenticated, de-authenticated, not authenticated.

The information is then contained in a table similar to Table 1 illustrated below:

which the service is to be supplied, or else it can be positioned in a remote service center for providing the service in a number of areas simultaneously; in addition, one of the two servers can be positioned locally, whilst the other can be positioned in the remote service center. When the database 34 is not integrated in the server, it can be positioned in the neighborhood of its own server, either locally or remotely, or else can be situated in a different point of the network.

The same applies to the database 16, which contains the user profiles. This database 16 can, in some cases, be made up of two or more different databases, the first of which belongs to the operator that manages the service and contains the profiles of its own users, whilst the others belong to other operators, such as for example mobile-radio ones, that have a roaming agreement with the service-provider operator. These other databases are in general situated in the network of the other operators, in some cases are shared with the mobile-radio networks themselves, and hence the link 35 for connection with the Authentication Server 16 consists of a geographic network based upon normal communication protocols.

FIG. 2 shows an example of a map contained in the database 34 that represents an indoor environment (for example, the plan of a floor in a company building) consisting of a multitude of offices and laboratories. On the map, the system administrator draws the different Authentication Areas (A1, A2, A3, A4, A5), i.e., the areas within which a terminal is authenticated via a given method, and associates said method to the area itself.

Once again with reference to FIG. 2, the method M1 is associated to the area A1, the method M2 to the area A2, etc.

TABLE 1

| Terminal ID | Time (Last Location) | Last Position (x, y) | Time (Last Authentication) | Authentication Area | Authentication Method | Result | Timer |
|---|---|---|---|---|---|---|---|
| Id1 | h1:m1:s1 | (x1, y1) | h'1:m'1:s'1 | A1 | M1 | Authent. | t1 |
| Id2 | h2:m2:s2 | (x2, y2) | h'2:m'2:s'2 | A2 | M2 | Not Authent. | t2 |
| Idn | hn:mn:sn | (xn, yn) | h'n:m'n:s'n | An | Mn | Authent. | tn |

The Authentication Server 14 dialogues through the link 35 (which can be a physical link in the Server Farm 20 itself or a logic link and can traverse other networks) with the User-Profile Database 16.

The arrangement described is irrespective of the physical construction of the network 19: this can be made up of a wired local network isolated from the "rest of the world", or else can be formed by the set of a local network and of a geographic network interconnected to one another via purposely provided devices, such as bridges, switches or routers.

In addition, the arrangement is irrespective of the technology with which the network 19 is built: this can be based upon the protocols of the IEEE 802 family (Ethernet, Token Ring, FDDI (Fiber-distributed data interface), etc.) and/or on the TCP/IP (Transmission Control Protocol/Internet Protocol), ATM (Asynchronous Transfer Mode) and Frame-Relay networking protocols. Finally, the network 19 may be a radio network. A similar reasoning applies to the links 21, 22, 23, 24 and 17.

The proposed arrangement is moreover irrespective of the position and physical construction of the Server Farm 20: this can hence be positioned locally, i.e., directly in the area in It is to be noted that in a given area it might be possible to have different authentication methods also as the user profile varies, and the services available in the individual areas could be different.

Alternatively, the Authentication Areas may be made to coincide with the individual cells, i.e., a different Area for each cell, or else with a combination of cells, i.e., a different Area for a number of cells. In this way, the Authentication Areas can be automatically obtained from the output of the normal cell-planning tools, which enable precisely calculation of the area covered by each cell.

Figure 4:
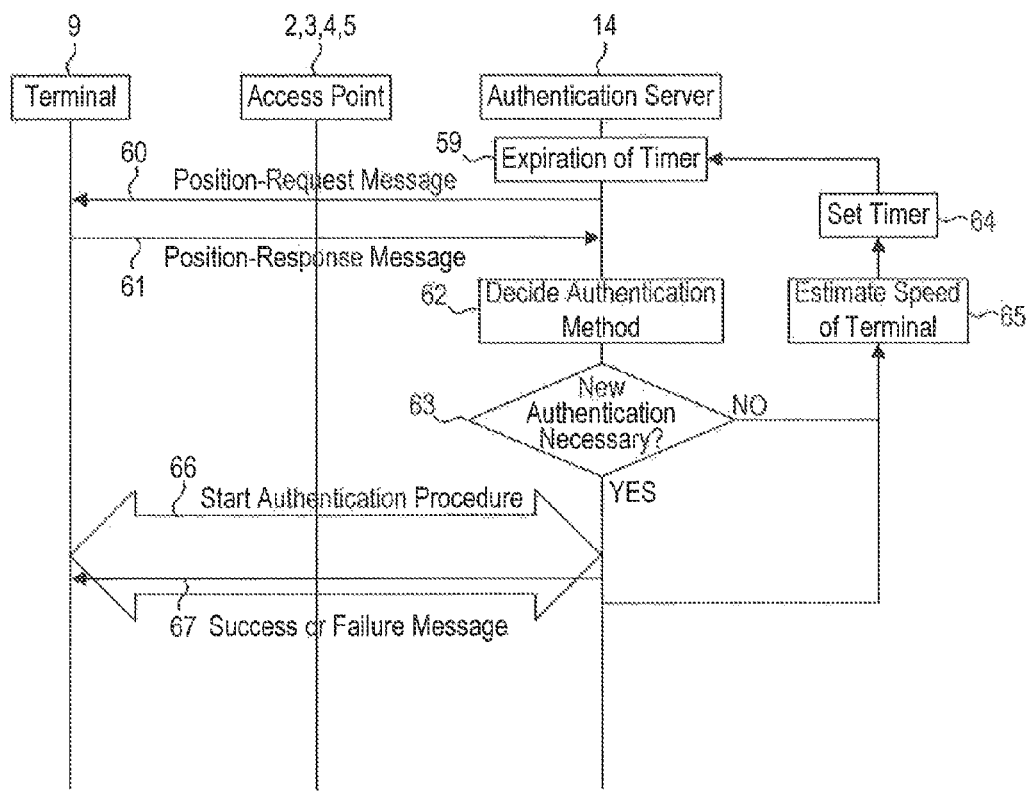
FIG. 4 illustrates the procedure corresponding to the subsequent authentications of the user.

The procedure used for managing authentication of a terminal on the basis of its position is given in FIGS. 3 and 4. In particular, FIG. 3 illustrates the procedure for the first authentication when the user enters the network, whereas FIG. 4 illustrates the procedure corresponding to the subsequent authentications.

The new EAP messages defined by the present arrangement are indicated in the figures with the thicker line.

When the terminal 9 enters the network, it receives from an Access Point (for example the Access Point 3), according to what is defined in the EAP standard, a Request message 50 in which it is asked to indicate its own identity. The terminal 9 responds to the Access Point 3 by supplying its own identity with a message 51, and the Access Point 3 forwards, with a message 52, said identity to the Authentication Server 14. At this point, the Authentication Server 14 needs to know the position of the terminal 9 and for this purpose sends thereto a position-request message 53 (EAP Position-Request message). The terminal 9 responds by entering its own position in position-response message 54 (EAP Position-Response message), which enables the Authentication Server 14, in a step 55, to decide which authentication method to use with the terminal 9 and to start the authentication procedure 56. This procedure terminates with a Success or Failure message 57, sent by the Authentication Server 14 to the terminal 9, said message indicating whether the authentication has been successful or not.

In the first case (EAP Success), the terminal 9 can start its own communications and use services made available by the network, using the normal communication protocols (for example, TCP/IP or ATM). In the latter case (EAP Failure), the traffic of the terminal 9 is blocked by the Access Point 3 as specified by the EAP standard, and hence the terminal 9 is unable to conduct attacks on the network. During the authentication procedure 56, the Authentication Server 14 dialogues with the database 16 to have from the latter the information necessary for the authentication itself, such as for example username and user password 9.

Whatever the outcome of the authentication procedure 56, the Authentication Server 14 continues to follow the movements of the terminal 9 for a possible new authentication in the case where this were to change Authentication Area. For this purpose, the Authentication Server 14 sets a timer 58, upon expiration of which (see FIG. 4, step 59) the server 14 sends a new EAP Position-Request message 60 to the terminal. The terminal 9 responds to the server 14 sending its position to it with an EAP Position-Response message 61.

At this point, in a step 62, the server 14 determines again, on the basis of the position received, the authentication method and, in a step 63, verifies whether a new authentication is necessary.

If the new authentication is not necessary (this is true if the method determined at step 62 is the same as the one used in the previous authentication), the server 14, in a step 64, once again sets the timer, upon expiration of which (step 59), it repeats the position request. Optionally, in a step 65, the server 14 can make an estimation of the speed of the terminal 9 and fix the timer, in the step 64, in a way that depends upon said speed. If in step 63 the server 14 deduces that a new authentication is necessary (this is true if the method determined in step 62 is different from the one used in the previous authentication), a new authentication procedure 66 is started, which terminates, as the previous one, with a Success or Failure message 67 sent by the server 14 to the terminal 9.

At the end of this procedure 66, the server 14, in a step 64, once again sets the timer, upon expiration of which (step 59), it repeats the position request to the terminal 9.

Also in this case, optionally, the server 14 can make, in a step 65, an estimation of the speed of the terminal 9 and set the timer at step 64 accordingly. Also in this case, during the authentication procedure 66, the Authentication Server 14 dialogues with the database 16 to have the information necessary for authentication of the terminal 9.

Figure 5:
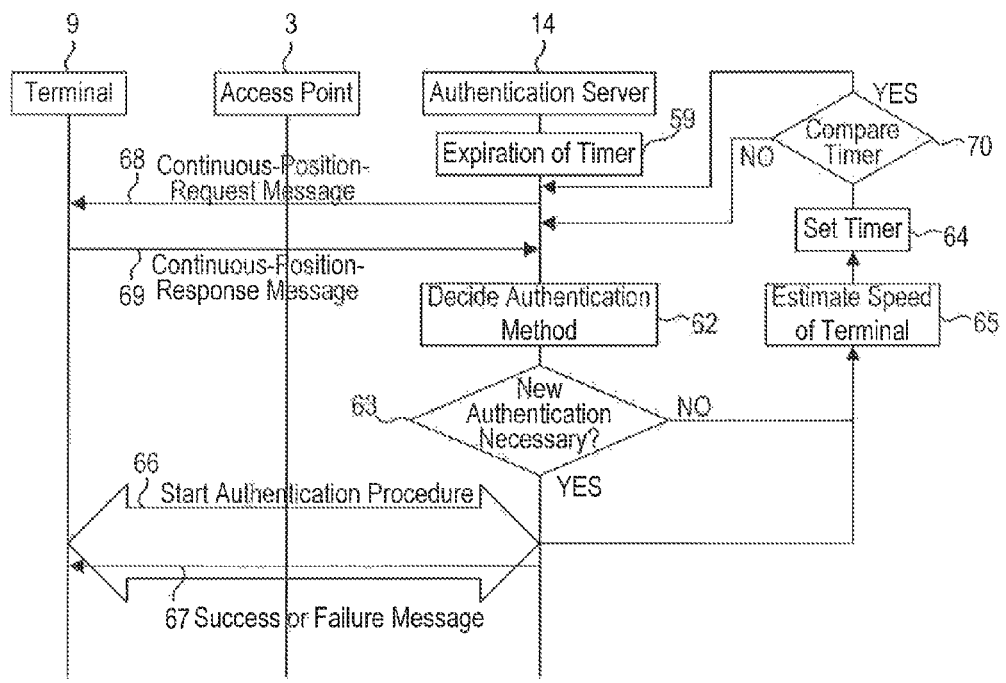
FIG. 5 illustrates a variant of the procedure of FIG. 4.

FIG. 5 illustrates a variant of the procedure of FIG. 4 in which, upon expiration of the timer in step 59, the server 14 asks the terminal 9 to communicate to it the position continuously at regular intervals (the interval is specified by the value of the timer parameter contained in the message), as indicated in a purposely provided request message 68 (EAP Continuous-Position-Request message sent by the server 14 to the terminal 9).

The terminal 9 responds to the above request by sending its own position to the server 14 in an EAP Continuous-Position-Response message 69. The EAP-Continuous-Position-Request message 68 is sent to the terminal 9 whenever, in step 70, the Authentication Server 14 determines that the value of the timer obtained in step 64 is different from the one used up to that moment, and in this case the message 68 sent to the terminal 9 contains the new value of the timer. Once the terminal 9 has received the message 68, it sends, via the EAP Continuous-Position-Response message 69, the responses to the server 14, with the new periodicity. In the case where, instead, in step 70 the Authentication Server 14 determines that the value of the timer obtained in step 64 is the same as the one used up to that moment, the EAP Continuous-Position-Request message 68 is not sent, whilst the terminal 9 sends its own position via the EAP Continuous-Position-Response message 69 without any change in periodicity.

Figure 6:
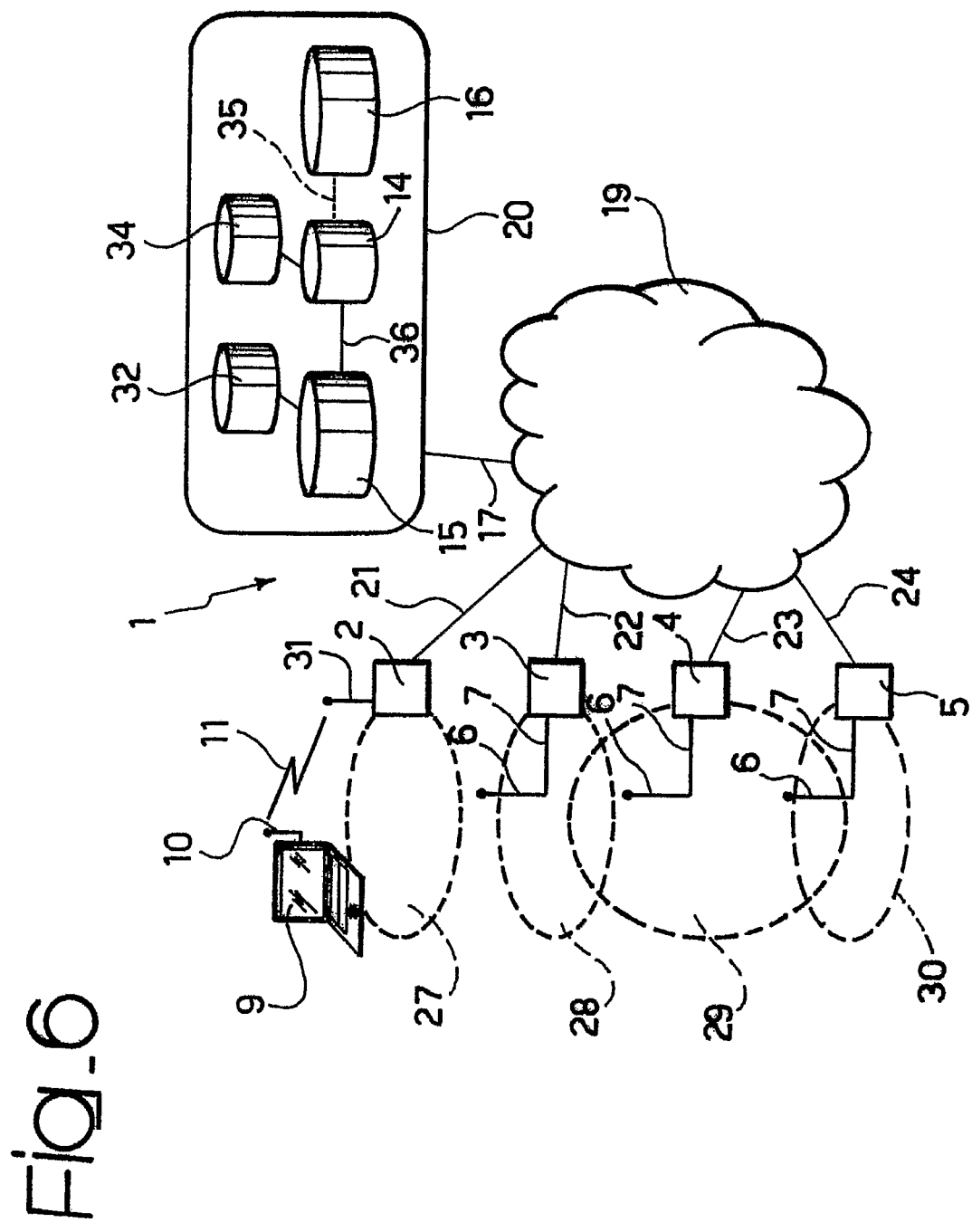
FIG. 6 illustrates a second example of scenario of application of the arrangement described herein.

A second scenario of use of the arrangement is illustrated in FIG. 6. This scenario differs from that of FIG. 1 for the presence of a Location Server 15 in the Server Farm 20. In this scenario, the terminal 9 is not able to determine its position but can exclusively perform the measurement of the signal received from the various Access Points 2, 3, 4, 5 (for example, the MAC address of the Access Points from which it receives a signal, the level of power received from the various Access Points, etc.), which is then sent to the Location Server 15 for its location.

The Location Server 15 has available a database 32 of its own, which can be integrated or otherwise with the server 15, in which the information necessary for location of the terminals is stored, such as for example the position of the Access Points, their radio-electrical parameters, etc.

The Location Server 15 moreover contains a location engine with the various algorithms to be used for calculation of the position of the terminals according to the type of measurements that these are able to perform. The Location Server 15 can be set in the Server Farm 20 or else locally in the network 19. When the database 32 is not integrated in the server 15, it can be positioned in the neighborhood of its own server 15, either locally or remotely, or else can be located in a different point of the network.

The Location Server 15 is connected to the Authentication Server 14 via a link 36. According to the arrangement of the two servers 14 and 15, the link 36 that connects them can be a dedicated point-to-point link or can be a logic link forming part of a local network or else forming part of a geographic network. The communications between the two servers 14 and 15 use the normal communication protocols such as TCP/IP, ATM or Frame Relay. In some cases, for example when the computational load is not excessive, the two servers 14 and 15 can be integrated in one and the same apparatus, as likewise can be the respective databases.

Figure 7:
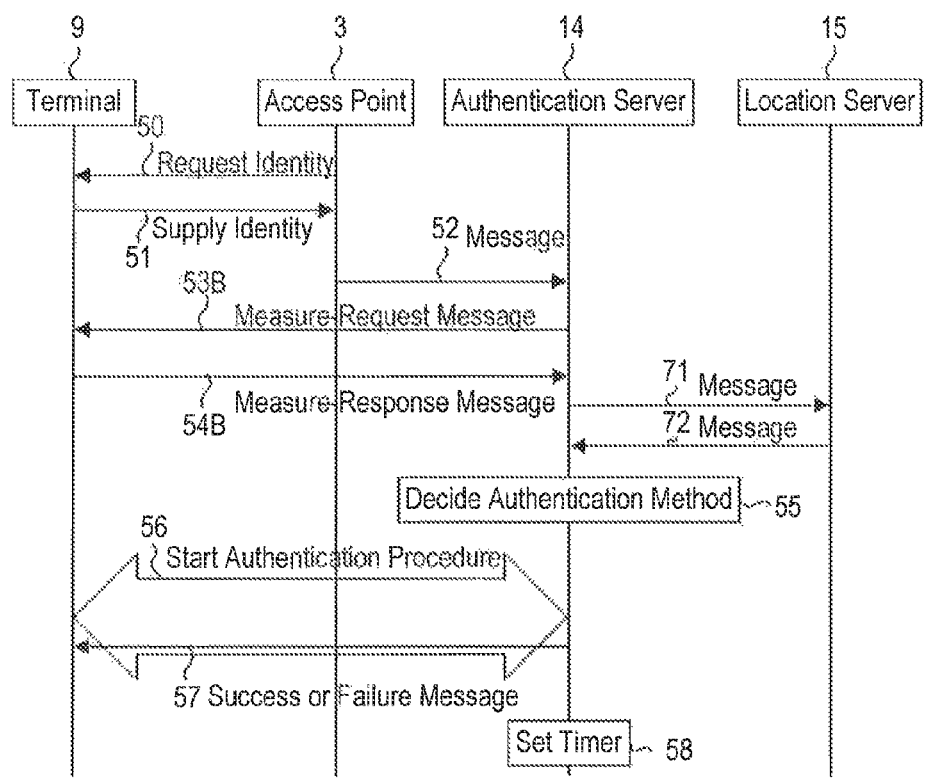
FIG. 7 illustrates a variant of the procedure corresponding to the first authentication of a user in the network of FIG. 6.
Figure 8:
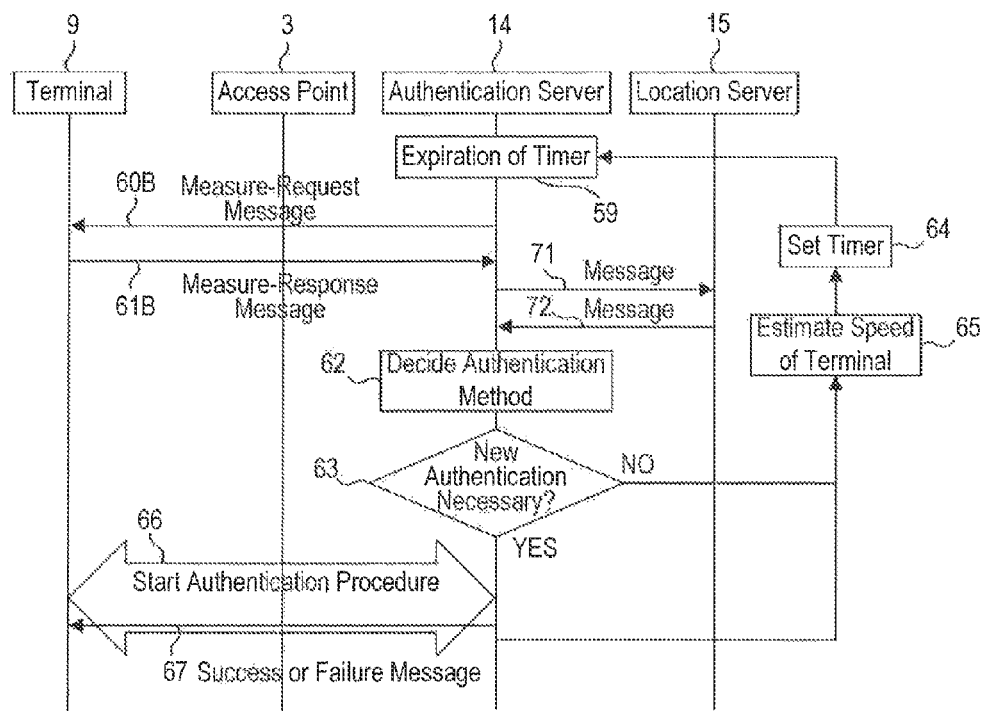
FIG. 8 illustrates a variant of the procedure corresponding to the subsequent authentications of the user.
Figure 9:
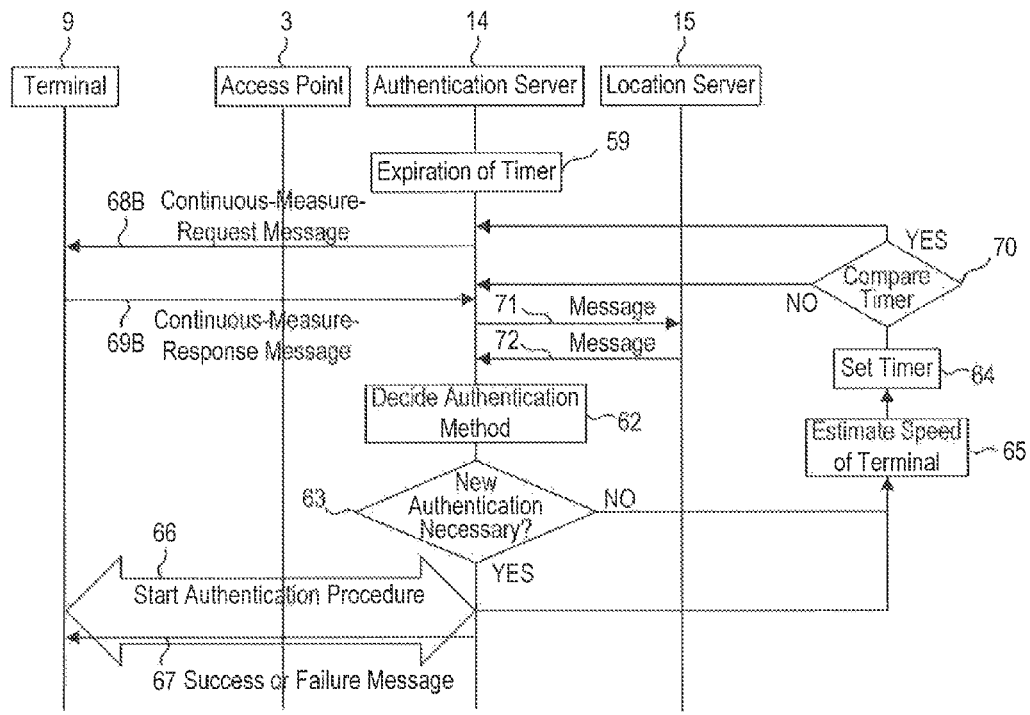
FIG. 9 illustrates a variant of the procedure of FIG. 8.

FIGS. 7, 8 and 9 illustrate the procedures of authentication of the terminal upon entry into the network and the subsequent authentications caused by movement of the terminal, Said procedures are identical to the ones illustrated in FIGS. 3, 4 and 5 with the difference that now the position messages (Request and Response) are replaced by measure messages (EAP Measure-Request message 53B, EAP Measure-Response message 54B, EAP Measure-Request message 60B, EAP Measure Response message 61B, EAP Continuous-Measure-Request message 68B, and EAP Continuous-Measure-Response message 69B) with which the Authentication Server 14 requests the measurements from the terminal 9

(Request) and the latter sends them (Response) There is moreover present a message 71 with which the Authentication Server 14 sends the measurements received to the Location Server 15, and a message 72 with which the Location Server 15 sends the position of the terminal 9 to the Authentication Server 14. The latter two messages use the normal communication protocols envisaged by the connection link 36 such as for example TCP/IP or ATM.

Figure 10:
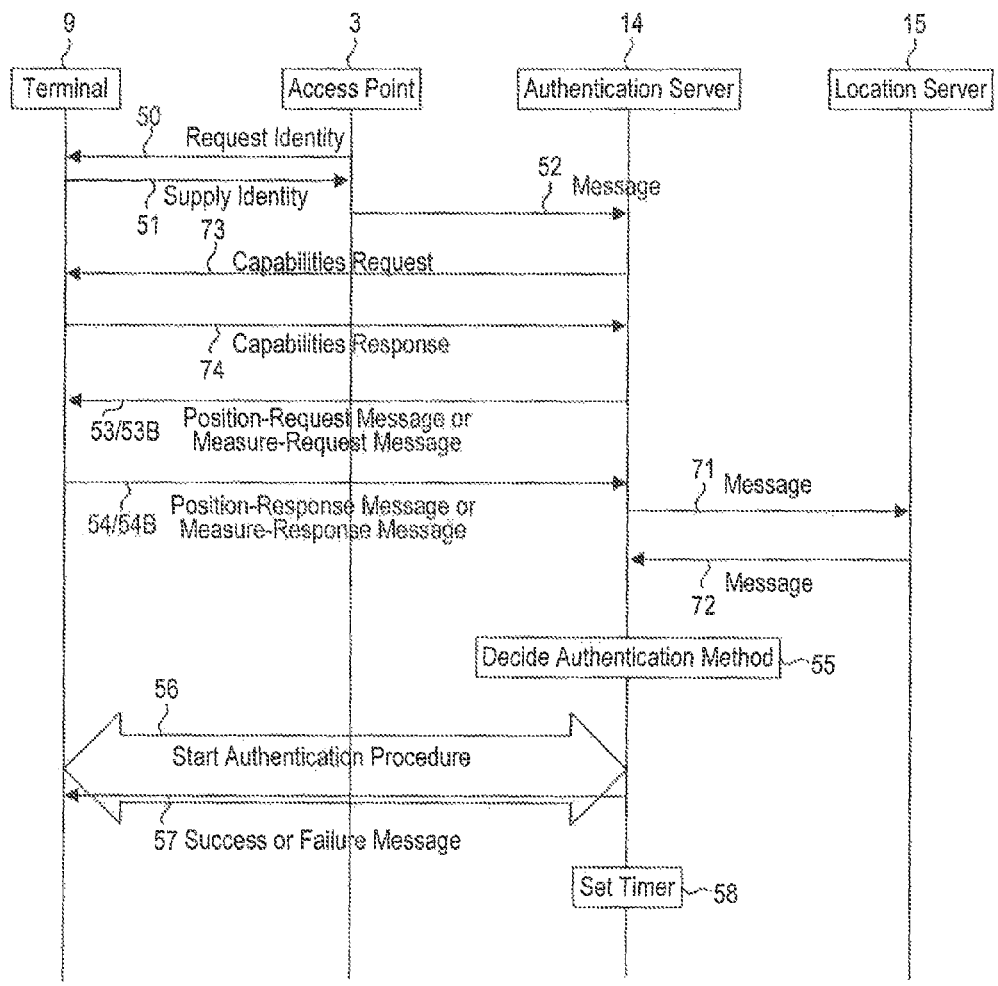
FIG. 10 illustrates the authentication procedure in the case where in the network of FIG. 6 there are terminals capable of determining their position and terminals that make the measurement of the signal received from the various Access Points.

FIG. 10 illustrates the sequence of messages in the case where, in the network of FIG. 6, there are present both terminals that are able to determine their position and terminals that make the measurement of the signal received from the various Access Points.

In this situation, when the terminal 9 enters the network, the Authentication Server 14 sends a message 73 of EAP Capabilities Request, with which it asks the terminal 9 to indicate its own capabilities (determination of the position or execution of the measurements); the latter responds with a message 74 of EAP Capabilities Response. At this point, the server 14 can start the first location sending an EAP Position-Request message 53 or an EAP Measure-Request message 53B according to the content of the EAP Capabilities-Response message 74.

The positions sent by the terminal 9 to the Authentication Server 14 and the ones sent by the Location Server 15 to the Authentication Server 14 contain the coordinates (x, y) of the terminal and possibly an estimate of the error committed in the calculation of the position. The coordinates identify the center c of a circle, whilst the estimate of the error identifies the radius r thereof; the position of that circle on the map of the areas enables the Authentication Server 14 to determine the Authentication Area in which the terminal 9 is located and hence the authentication method to be applied thereto (in step 55 of FIGS. 3, 7 and 10 and in step 62 of FIGS. 4, 5, 8 and 9).

The procedure adopted is the following:
  if the circle is completely contained within an Authentication Area, as illustrated in FIG. 11, the authentication method to be used is the one proper to the area (in the specific example of FIG. 11, it is the method M4);
  if the circle intersects a number of Authentication Areas, as illustrated for example in FIG. 12, the Authentication Server 14 uses one of the following options, which can be configured by the system administrator in the set-up stage:
    it selects the method of the area in which the center c of the circle (method M5 in the example of FIG. 11) falls; or else
    it calculates the percentage of area of the circle that falls in each Authentication Area and chooses the method of the Area with highest percentage (method M5 in the example of FIG. 11); or else
    it chooses the method that is the most robust (or the weakest according to the initial choice made by the system administrator) between the ones corresponding to the Authentication Areas intersected; or else
    it waits to receive a new position (in order to prevent an infinite cycle, the system administrator decides the maximum number of attempts that the Authentication Server 14 can make before taking a decision on the method according to the three previous points).

The Authentication Server 14 keeps, in its database 34, a table similar to Table 1 appearing previously, in which it enters the result of all the operations executed. The fields that make it up are the following:
  Terminal Id: this contains the terminal identifier and is entered in the table when the terminal enters the network (first authentication);
  Time (Last Location): this indicates the time at which the last location has been derived for the terminal;
  Last Position (x, y, err): this contains the coordinates of the last position occupied by the terminal and the possible error associated to the position;
  Time (Last Authentication): this indicates the time at which the last authentication was made for the terminal;
  Authentication Area: this indicates the Authentication Area corresponding to the position of the terminal; it is entered the first time in step 55 and is possibly modified in step 63 if the last area is different from the one decided in step 62;
  Authentication Method: this indicates the Authentication Method used for authentication of the terminal; it is entered the first time in step 55 and is possibly modified in step 63 if the last method used is different from the one decided in step 62;
  Result: this indicates the result of the authentication operation (steps 56 and 66) and can be "Authenticated" or "Not authenticated";
  Timer: this indicates the value of the timer to be used between two consecutive locations and is set the first time in the step 58 and is then possibly updated with the result of step 64.

In the process of location, the Location Server 15 uses the measurements made by the terminal 9. In general, a terminal 9 is able to measure the following quantities: server Access Point (referred to in what follows as Main Access Point), i.e., the identifier of the Access Point through which the terminal accesses the network; adjacent Access Points, i.e., the identifiers of the Access Points from which the terminal receives a signal; one or more radio-electrical parameters, such as, for example, the power, or performance parameters, such as the BER (Bit Error Rate) or the PER (Packet Error Rate), measured on the signal received by the terminal and transmitted by the Main AP; and one or more radio-electrical parameters or performance parameters measured on all the signals received by the terminal and transmitted by the adjacent Access Points.

The Location Server 15 has available different location algorithms, i.e., an algorithm for each kind of measurements that the terminal 9 is able to do (i.e. Main Access Point, Main Access Point+adjacent Access Points, etc.). Such a Location Server is able to locate any terminal. The procedure used in the location process is the following:
  the Location Server 15 receives from the Authentication Server 14 the set of measurements made by the terminal 9;
  the Location Server 15, and in particular its location engine, selects the algorithm to be used on the basis of the measurements received; and
  the Location Server 15 restores to the Authentication Server 14 the estimated position of the terminal 9, namely, its coordinates x, y, and the estimate of the error on the position.

It is evident that the arrangement just described can be used without any substantial modification even for managing the ciphering and/or integrity-protection method and the corresponding lengths/times of validity of the keys to be used in the secure communications between the terminal and the network downstream of the correct authentication. The arrangement proposed can likewise be used only for managing updating of the ciphering and/or integrity-protection keys (and/or methods) and/or the length of the keys on a position basis.

In the aforesaid additional cases of applicability of the solution, it is clear that extensions are used that involve amongst other things the EAP messages and the contents of the various databases. In fact, for example, Table 1 may be extended to contain information fields corresponding to the ciphering/integrity-protection keys (e.g., length, duration of validity, algorithm with which the key is to be used, etc.) that refer to the case in which the solution can be used for making refresh of the keys and/or varying their lengths and/or vary the ciphering/integrity-protection algorithms.

Illustrated in what follows are a number of examples of formats of the messages described previously.

In particular, the format of an EAP Position-Request message (for example, the message 53 of FIG. 3 and the message 60 of FIG. 4) is illustrated below:

| Code (=1) | Identifier | Length |
|---|---|---|
| Type | | |
| | Terminal Identifier | | whilst the format of an EAP Position-Response message (for example, the message 54 of FIG. 3 and the message 61 of FIG. 4) is illustrated below:

| Code (=2) | Identifier | Length |
|---|---|---|
| Type | | |
| | Terminal Identifier | |
| | Terminal Position | |
| | Terminal Position Error | |

The fields Code, Identifier and Length are in compliance with the EAP standard and assume the values specified thereby in Paragraph 4 of the document RFC 3748. In particular, the Code field assumes the value 1 in the EAP Position-Request message and the value 2 in the EAP Position-Response message.

The field Type has the format in compliance with the one defined in Paragraph 5 of the document RFC 3748, whilst its value is appropriately defined in such a way that it is different from any Type so far defined. For example, it may be set equal to 100 both in the EAP Position-Request message and in the EAP Position-Response message. The rest of the EAP Position-Request message contains the identifier of the terminal that is to measure its own position (Terminal Identifier field), whilst the rest of the EAP Position-Response message contains the following three fields:

the identifier of the terminal that has measured its own position (Terminal-Identifier field);

its own position, i.e., its own coordinates (x, y, z) with respect to a known reference system (Terminal-Position field); and the error committed in the estimate of the position (Terminal-Position-Error field).

The format of an EAP Continuous-Position-Request message (for example the message 68 of FIG. 5) is illustrated below:

| Code (=1) | Identifier | Length |
|---|---|---|
| Type | | |
| | Terminal Identifier | |
| | Timer | | whilst the format of an EAP Continuous-Position-Response message (for example, the message 69 of FIG. 5) is illustrated below:

| Code (=2) | Identifier | Length |
|---|---|---|
| Type | | |
| | Terminal Identifier | |
| | Terminal Position | |
| | Terminal Position Error | |
| | Timer | |

Also for these messages the fields Code, Identifier and Length are in compliance with the EAP standard and assume the values specified thereby in Paragraph 4 of the document RFC 3748. Also in this case, the Code field assumes the value 1 in the EAP Continuous-Position-Request message and the value 2 in the EAP Continuous-Position-Response message. The Type field has the format in compliance with the one defined in Paragraph 5 of the document RFC 3748, whilst its value is appropriately defined in such a way said that it is different from any Type so far defined.

For example, it can be set equal to 101 both in the EAP Continuous-Position-Request message and in the EAP Continuous-Position-Response message. The rest of the EAP Continuous-Position-Request message, in addition to the identifier of the terminal that must measure its own position (Terminal-Identifier field), also contains the period (Timer field) with which the position is to be measured. The Timer field, which has the same meaning, is also included in the EAP Continuous-Position-Response message together with the three fields defined for the EAP Position-Response message.

In a similar way, it is possible to define the EAP Measure-Request, EAP Measure-Response, EAP Continuous-Measure-Request and EAP Continuous-Measure-Response messages. The EAP Measure-Request and EAP Measure-Response messages have a Type field equal to 102, whilst the EAP Continuous-Measure-Request and EAP Continuous-Measure-Response messages have a Type field equal to 103. The EAP Measure-Request message contains the identifier of the terminal that is to perform the measurements on the signal received, whilst the EAP Measure-Response message contains the identifier of the terminal that has made the measurement, as well as the measurements made. The EAP Continuous-Measure-Request and EAP Continuous-Measure-Response messages also contain the period (Timer field) with which the position is to be measured and with which it has been measured, respectively.

Illustrated below is an alternative modality whereby the messages described previously can be defined:

| Code (=1) | Identifier | Length |
|---|---|---|
| Type | Subtype | |
| | Terminal Identifier | |

The proposed format refers in particular to the EAP Position-Request message (message 53 of FIG. 3 and message 60 of FIG. 4).

Inserted therein is the Subtype field, which differentiates all the new messages introduced by the arrangement described herein, assuming for example the value 1 for the EAP Position-Request message and the EAP Position-Response message, the value 2 for the EAP Continuous-Position-Request message and EAP Continuous-Position-Response message, etc. The value of the Type field is instead unique for all the messages and equal to a value defined in such a way that it is different from any Type up to now defined. The rest of the messages remain unaltered.

Consequently, without prejudice to the underlying principles of the invention, the details and embodiments may vary, even appreciably, with respect to what has been described and shown by way of example only, without departing from the scope of the invention as defined by the annexed claims.

The invention claimed is:

1. A method of authenticating a wireless terminal for inclusion of said terminal in a wireless communication network, wherein authentication is conditioned upon identification and location information transmitted from said terminal to at least one server in the network, comprising:
   providing in the network at least one access point for the terminal, said access point being configured to transmit authentication messages using a message format defined by the Extensible Authentication Protocol from a non-authenticated terminal to an authentication server in the network, the authentication messages including the identification and location information, wherein said location information comprises measurement information autonomously determined by the non-authenticated terminal;
   associating with said network a location server;
   transmitting identification information from said terminal to said authentication server using said message format;
   receiving a request for measurement information at said terminal sent by said authentication server, wherein said measurement information is a measurement of a signal received by the terminal from a wireless access point; and
   in response to said request, transmitting said measurement information from said terminal to said authentication server by conveying said measurement information using said message format, prior to completion of any authentication processing of said identification information,
   wherein said location server produces, based on said measurement information transmitted from said terminal, position information identifying a position of the terminal, and
   wherein a method to be used for the authentication processing of said identification information is determined based on the position information.

2. The method of claim 1,
   wherein said transmitting said measurement information from said terminal to said authentication server includes:
   said terminal transmitting said measurement information to said location server; and
   said location server transmitting said position information identifying the position of the terminal to said authentication server.

3. The method of claim 1,
   wherein said transmitting said measurement information from said terminal to said authentication server includes:
   said authentication server receiving from said terminal an authentication request as well as said measurement information;
   said authentication server sending said measurement information to said location server;
   said location server sending said position information identifying the position of the terminal to said authentication server; and
   said authentication server performing an authentication procedure of said terminal with said network.

4. The method of claim 1, comprising said terminal sending to said authentication server, after said authentication procedure, further measurement information for use in subsequent authentication procedures.

5. The method of claim 4, comprising said terminal sending to said authentication server said further measurement information irrespective of the outcome of said authentication procedure.

6. The method of claim 1, comprising said at least one access point blocking, as long as said terminal is non-authenticated with said network, the traffic from said terminal other than traffic conveyed using said message format.

7. The method of claim 1, comprising said authentication server continuing to receive from said terminal said measurement information conveyed using said message format after said terminal is authenticated with said network.

8. The method of claim 1, comprising selecting said message format as a signaling protocol or a protocol of the extensible authentication protocol type.

9. The method of claim 8 comprising selecting said message format from the group of the so-called extensible authentication protocol methods, extensible authentication protocol-security information management, protected extensible authentication protocol or lightweight extensible authentication protocol.

10. The method of claim 1, comprising associating with said measurement information conveyed using said message format, secrets for ensuring security of information exchanged by said terminal.

11. A system for authenticating a wireless terminal for inclusion of said terminal in a wireless communication network, wherein authentication is conditioned upon location information transmitted from said terminal to at least one server in the network, comprising:
    at least one access point configured to:
      transmit authentication messages using a message format defined by the Extensible Authentication Protocol from a non-authenticated terminal to an authentication server in the network, the authentication messages including the identification and location information, wherein said location information comprises measurement information autonomously determined by the non-authenticated terminal;
      transmit identification information from said terminal to said authentication server using said message format;
      receive a request for measurement information at said terminal sent by said authentication server, wherein said measurement information is a measurement of a signal received by the terminal from a wireless access point; and
      in response to said request, transmit said measurement information from said terminal to said authentication server by conveying said measurement information using said message format, prior to completion of any authentication processing of said identification information,
    wherein a location server associated with said network produces, based on said measurement information transmitted from said terminal, position information identifying a position of the terminal, and
    wherein a method to be used for the authentication processing of said identification information is determined based on the position information.

12. A non-transitory computer readable medium encoded with instructions that when executed by at least one computer of at least one access point of a wireless telecommunication network perform a method of authenticating a terminal for inclusion of said terminal in a communication network, wherein authentication is conditioned upon identification and location information transmitted from said terminal to at least one server in the network, comprising:

transmitting authentication messages using a message format defined by the Extensible Authentication Protocol from a non-authenticated terminal to an authentication server in the network, the authentication messages including the identification and location information, wherein said location information comprises measurement information autonomously determined by the non-authenticated terminal;

transmitting identification information from said terminal to said authentication server using said message format;

receiving a request for measurement information at said terminal sent by said authentication server, wherein said measurement information is a measurement of a signal received by the terminal from a wireless access point; and in response to said request, transmitting said measurement information from said terminal to said authentication server by conveying said location information using said message format, prior to completion of any authentication processing of said identification information, wherein a location server associated with said network produces, based on said measurement information transmitted from said terminal, position information identifying a position of the terminal, and wherein a method to be used for the authentication processing of said identification information is determined based on the position information.

\* \* \* \* \*